United States Patent
Cabrera et al.

(10) Patent No.: US 9,195,406 B2
(45) Date of Patent: Nov. 24, 2015

(54) OPERATION MANAGEMENT IN A MEMORY DEVICE

(71) Applicant: Micron Technology, Inc., Boise, ID (US)

(72) Inventors: Anthony R. Cabrera, Folsom, CA (US); Nicholas Hendrickson, Burnsville, MN (US); Robert Melcher, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 326 days.

(21) Appl. No.: 13/930,715

(22) Filed: Jun. 28, 2013

(65) Prior Publication Data

US 2015/0006786 A1    Jan. 1, 2015

(51) Int. Cl.
*G06F 3/00* (2006.01)
*G06F 3/06* (2006.01)

(52) U.S. Cl.
CPC ............ *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,619,922 B2 | 11/2009 | Li et al. | |
| 8,054,684 B2 | 11/2011 | Gorobets et al. | |
| 2009/0113558 A1 | 4/2009 | Prabhakaran et al. | |
| 2009/0164750 A1 | 6/2009 | Atri et al. | |
| 2010/0306446 A1 | 12/2010 | Villa et al. | |
| 2012/0173792 A1 | 7/2012 | Lassa et al. | |
| 2014/0215175 A1* | 7/2014 | Kasorla et al. | 711/167 |

OTHER PUBLICATIONS

U.S. Appl. No. 12/548,375, filed Aug. 26, 2009, "Full Chip Wear Leveling in Memory Device," Melcher et al.

* cited by examiner

*Primary Examiner* — Cheng-Yuan Tseng
*Assistant Examiner* — Craig Goldschmidt
(74) *Attorney, Agent, or Firm* — Dicke, Billig & Czaja, PLLC

(57) ABSTRACT

Multiple segment operations having non-volatile state trackers in memory devices are disclosed. Operations are segmented in multiple segments and selectively performed to avoid violating timing requirements within a memory device. In at least one embodiment, a memory device operation is segmented into a plurality of segments and selectively performed within time frames of other memory device operations. Non-volatile state trackers maintain state values corresponding to each segment of multiple segmented operations.

30 Claims, 8 Drawing Sheets

OPERATION MANAGEMENT IN A MEMORY DEVICE

TECHNICAL FIELD

The present disclosure relates generally to memory and in particular, in one or more embodiments, the present disclosure relates to management of operations in memory devices.

BACKGROUND

Memory devices are typically provided as internal, semiconductor, integrated circuits in computers or other electronic systems. There are many different types of memory including random-access memory (RAM), read only memory (ROM), dynamic random access memory (DRAM), synchronous dynamic random access memory (SDRAM), resistive random access memory (RRAM), double data rate memory (DDR), low power double data rate memory (LPDDR), phase change memory (PCM) and Flash memory.

Non-volatile memory is memory that can retain its stored data for some extended period without the application of power. Flash memory devices have developed into a popular source of non-volatile memory for a wide range of electronic applications. Flash memory devices are commonly used in electronic systems, such as personal computers, personal digital assistants (PDAs), digital cameras, digital media players, digital recorders, games, appliances, vehicles, wireless devices, cellular telephones, and removable memory modules, and the uses for Flash memory continue to expand.

Many memory devices, such as commonly included in some electronic systems, perform various operations to manage the operation of the memory device. Memory devices typically perform memory operations such as reading, writing and erasing operations. These operations are sometimes referred to as foreground operations as these operations are sometimes initiated by a memory access device, such as a processor, or other memory device control circuitry coupled to the memory device. Additional operations include what are sometimes referred to as background operations. These operations are sometimes initiated by control circuitry in a memory device itself. Wear-leveling in memory devices might be performed as a background operation, for example. Wear-leveling operations might be performed to distribute memory erase cycles across a memory array of a memory device in an effort to improve reliability. As the demand for higher operating speeds in memory devices continue to increase, violation of timing requirements of memory devices may occur as a result of performing one or more of these background operations.

For the reasons stated above, and for other reasons stated below which will become apparent to those skilled in the art upon reading and understanding the present specification, there is a need in the art for mitigating violating memory device timing requirements as a result of performing operations, such as background operations, in memory devices.

DETAILED DESCRIPTION

Figure 1:
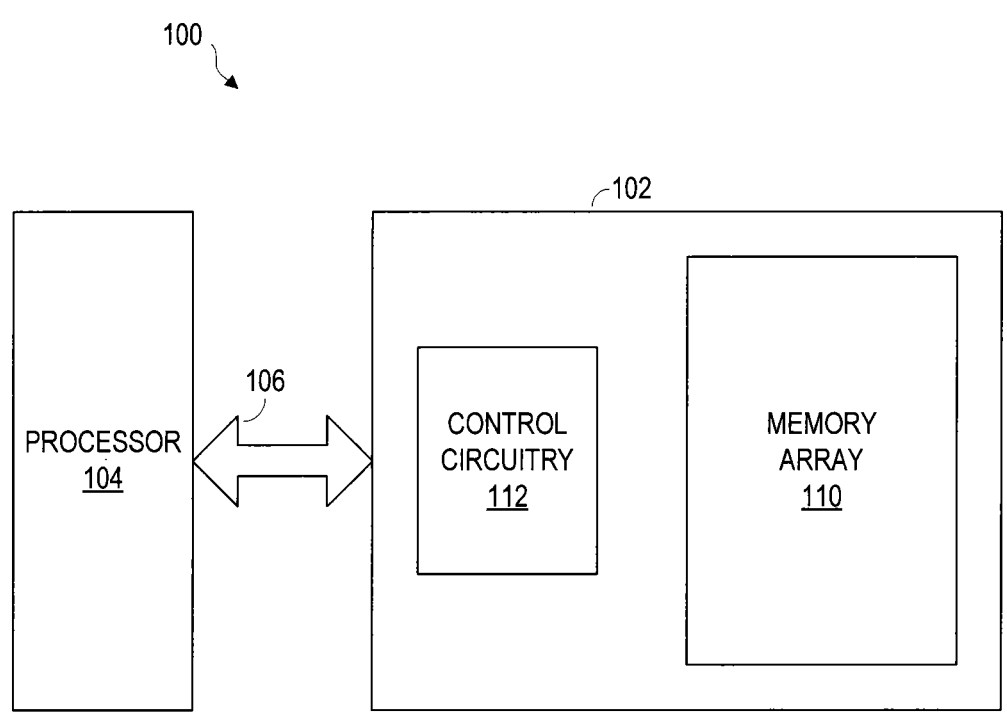
FIG. 1 is a simplified block diagram of a memory device coupled to a memory access device as part of an electronic system.

In the following detailed description of the invention, reference is made to the accompanying drawings that form a part hereof, and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

FIG. 1 illustrates a simplified block diagram of a memory device 102 coupled to a memory access device 104 as part of an electronic system 100. The memory access device 104 might be a processor or some other type of control circuitry. The memory device 102 is coupled to the processor 104 over one or more communications channels 106 (e.g., communications bus.) The communications bus might comprise command, address and/or data signal lines. The communications bus might comprise a number of standard interfaces, such as a Universal Serial Bus (USB) interface, for example. The communications bus might be a standard interface used with many hard disk drives (e.g., SATA, PATA) as are known to those skilled in the art. Together, the memory device 102, memory access device 104 and the communications bus 106 form part of the electronic system 100.

Memory device 102 further comprises a memory array 110, such as comprising an array of memory cells, for example. Memory device operations to be performed on the memory array 110 are facilitated by memory array control circuitry 112. The processor 104 might transfer one or more commands to the memory device 102 via the communications bus to perform an operation on the memory array 110, such as a read, write (e.g., programming) and/or erase operation. These operations are sometimes referred to as foreground operations as they may be performed responsive to a specific command received from the processor 104, for example.

Memory array 110 might comprise one or more types of memory, such as an array of Flash memory cells, for example. Flash memory typically utilizes one of two basic architectures known as NOR Flash and NAND Flash. The designation is derived from the logic used to read the devices. In NOR Flash architecture, a logical column of memory cells is coupled in parallel with each memory cell coupled to a data line, such as those typically referred to as digit (e.g., bit) lines. In NAND Flash architecture, a column of memory cells is coupled in series with only the first memory cell of the column coupled to a bit line. Control gates of memory cells comprising a row of memory cells are coupled to access lines, such as those typically referred to as word lines.

In a typical Flash memory array, each selected memory cell is individually programmed as either a single level cell (SLC)

or a multiple level cell (MLC). The cell's threshold voltage ($V_t$) can be used as an indication of the data stored in the cell. For example, in an SLC, a $V_t$ of 2.5V might indicate a programmed cell while a $V_t$ of −0.5V might indicate an erased cell. An MLC uses multiple $V_t$ ranges that each indicates a different state. Multiple level cells can take advantage of the analog nature of a traditional charge storage cell by assigning a bit pattern to a specific $V_t$ range.

Programming Flash memory cells typically involves applying one or more programming pulses (Vpgm) to a selected word line coupled to one or more selected memory cells. Typical programming pulses (Vpgm) start at or near 15V and tend to increase in magnitude with each programming pulse application. During a programming operation, a potential, such as a ground potential (e.g., 0V), is applied to the substrate of the array, and thus to the channels of the selected memory cells. This results in a charge transfer from the channel to the charge storage structures of memory cells selected for programming. For example, floating gates are typically charged through direct injection or Fowler-Nordheim tunneling of electrons from the channel to the floating gate, resulting in a $V_t$ typically greater than zero in a programmed state. Performing a sense (e.g., read) operation on one or more selected memory cells of the memory array typically requires applying voltages to the selected memory cells which are typically at or below Vcc, such as 3V, for example.

Memory array 110 might comprise an array of phase change memory (PCM) PCM is a resistive memory technology that can provide non-volatile storage but has the potential of relatively faster operation compared to flash memory. PCM, as the name implies, uses the change in resistance of a material when it changes phase in order to store data in a non-volatile manner. For example, an alloy of different elements might change from a crystalline phase having a low resistance to an amorphous phase having a high resistance. When the material exhibits multiple distinctly different resistances, each different resistance can be assigned a respective data value (e.g., 00, 01, 10, 11).

Memory array 110 might comprise other types of memory such as a dynamic random access memory (DRAM), a synchronous dynamic random access memory (SDRAM), resistive random access memory (RRAM), a double data rate memory (DDR) and/or low power double data rate memory (LPDDR), for example. Memory device 102 might comprise more than one type of memory, such as a combination of volatile and non-volatile memory, for example.

Figure 2:
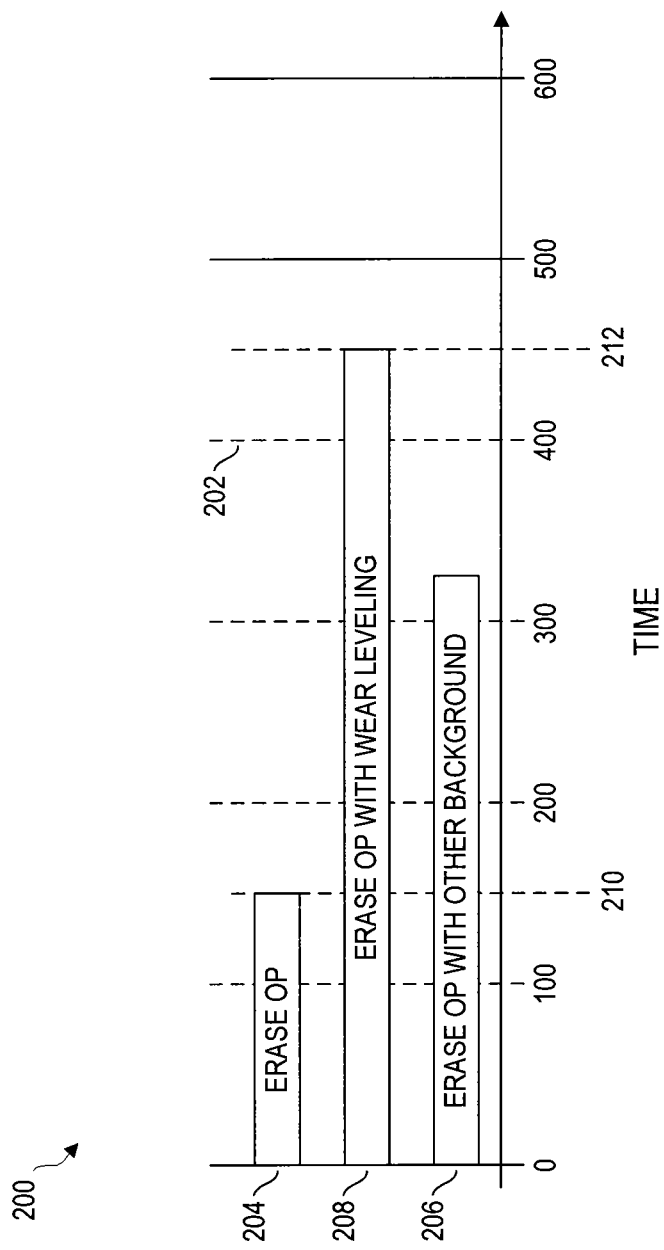
FIG. 2 is a timing diagram of memory operations in a memory device.

FIG. 2 illustrates a timing diagram 200 for a number of memory operations, such as including foreground and background operations, performed in a memory device. For an example illustrated by FIG. 2, a time frame specified for the memory device to perform a complete foreground operation, such as an erase operation, might be indicated at line 202. A time frame might comprise a time frame assigned (e.g., assigned as a timing requirement) to a particular foreground operation. The memory device should complete the particular foreground operation within the time frame (e.g., meet the timing requirement) after the memory device has been commanded to perform the operation, such as by a processor, for example. Bar 204 is illustrative of a duration of time to perform an erase operation in the memory device, such as a flash memory device, for example. It can be seen from FIG. 2 that the time to perform the erase operation 204 is within the time frame 202. Bar 206 illustrates a duration for performing an erase operation, such as indicated by bar 204, and another operation, such as a particular background operation. It can be seen that the duration of the erase operation and the particular background operation as represented by bar 206 is within the time frame 202.

Bar 208 illustrates a duration to complete an erase operation and perform a different background operation than represented by bar 206, such as performing an erase operation and a wear-leveling operation in the memory device, for example. It can be seen from bar 208 that the time frame 202 has been exceeded by performing the erase operation and a complete wear-leveling operation. The time to perform the erase operation corresponding to bar 208 might be indicated by line 210 whereas the time between line 210 and 212 might correspond to the time to complete the wear-leveling operation, for example. Thus, the duration of performing the erase operation and a wear-leveling operation 212 violates a timing requirement for the memory device.

Figure 3:
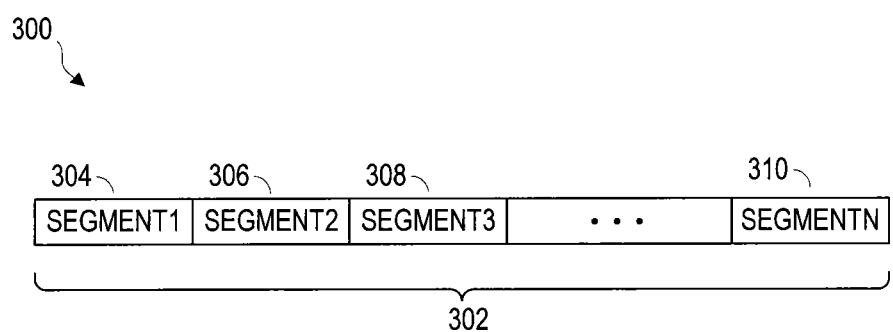
FIG. 3 is a simplified block diagram representative of a segmented operation according to an embodiment of the present disclosure.

FIG. 3 illustrates a simplified block diagram 300 representative of a segmented operation (e.g., segmented background operation) 302 according to various embodiments of the present disclosure. As discussed above, performing multiple operations, such as the erase operation and the wear-leveling operation associated with bar 208 of FIG. 2, violated a timing requirement for the memory device. FIG. 3 illustrates that an operation 302, such as a background operation, might be divided (e.g., segmented) into a number of N segments. For example, it might be determined that a wear-leveling operation be segmented into a number of portions, such as into segments SEGMENT1-SEGMENTN 304-310. The length of each segment is determined wherein at least one segment of the segmented operation might be performed along with another operation, such as an erase operation, and not violate a particular timing requirement of the memory device.

Figure 4:
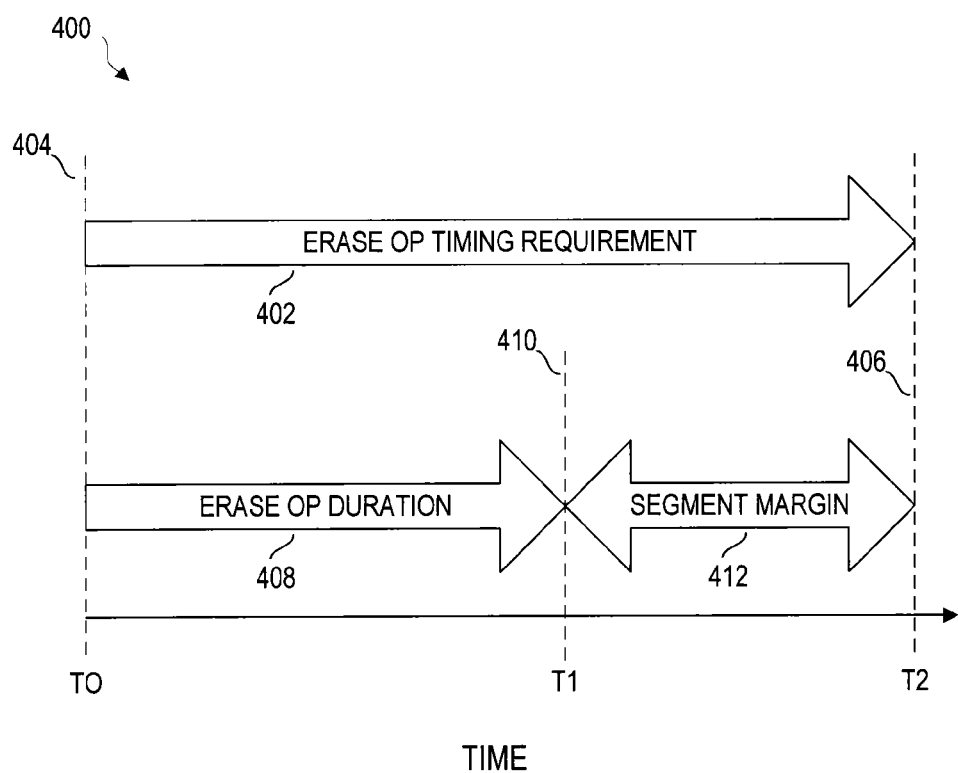
FIG. 4 illustrates a graphical representation of determining segments margins of memory operations according to an embodiment of the present disclosure.

FIG. 4 illustrates a graphical representation 400 of how segment lengths might be determined for one or more operations (e.g., background operations) according to various embodiments of the present disclosure. Time frames for different memory operations, such as read, write and/or erase operations, might be defined (e.g., defined as timing requirements) and vary for memory devices. The time frame 406 (e.g., maximum time duration) to complete an operation might comprise a duration 402 (e.g., time frame) as indicated between lines T0 404 and T2 406. The time frame to perform an operation, such as an erase operation, is determined and is indicated by arrow 408 between lines T0 404 and T1 410.

The erase operation duration represented by arrow 408 might be determined by various methods. The duration of the erase operation 408 might comprise an estimated or averaged time duration, for example. The erase operation duration 408 might be experimentally determined by performing a number of erase operations in a representative memory device and measuring a duration to complete each erase operation. A worst case measurement might be used as the erase operation duration 408, for example. Alternatively, an average of the measured erase times or some other type of algorithm might be used to determine the erase operation duration 408. The erase operation duration determination might further depend on various factors, such as the amount of memory undergoing an erase operation, for example.

The difference between the determined erase operation duration 408 (e.g., T1-T0) indicated at line T1 410 and the time frame indicated at line T2 406 might be referred to as a segment margin 412 (e.g., T2-T1). A segment length (e.g., maximum segment length) for segmenting a particular background operation might be assigned to be less than or equal to the segment margin 412 according to one or more embodiments of the present disclosure. Thus, one or more segments of various background operations might be performed (e.g., executed) within one or more margins (e.g., segment margins 412) of a foreground operation without violating a timing requirement corresponding to the foreground operation.

According to one or more embodiments, it might be desirable to perform a wear-leveling operation utilizing the time between the completion of an erase operation 410 and the expiration of a time frame for the erase operation 406 in a memory device, such as (T2-T1) as shown in FIG. 4, for example. The wear-leveling operation might be segmented into a plurality of segments where each segment length of the segmented wear-leveling operation is less than or equal to the segment margin 412 shown in FIG. 4. Thus, one or more segments of the segmented wear-leveling operation might be performed following each of a plurality of erase operations until each segment of the segmented wear-leveling operation is complete and without violating a timing requirement of the memory device.

Figure 5:
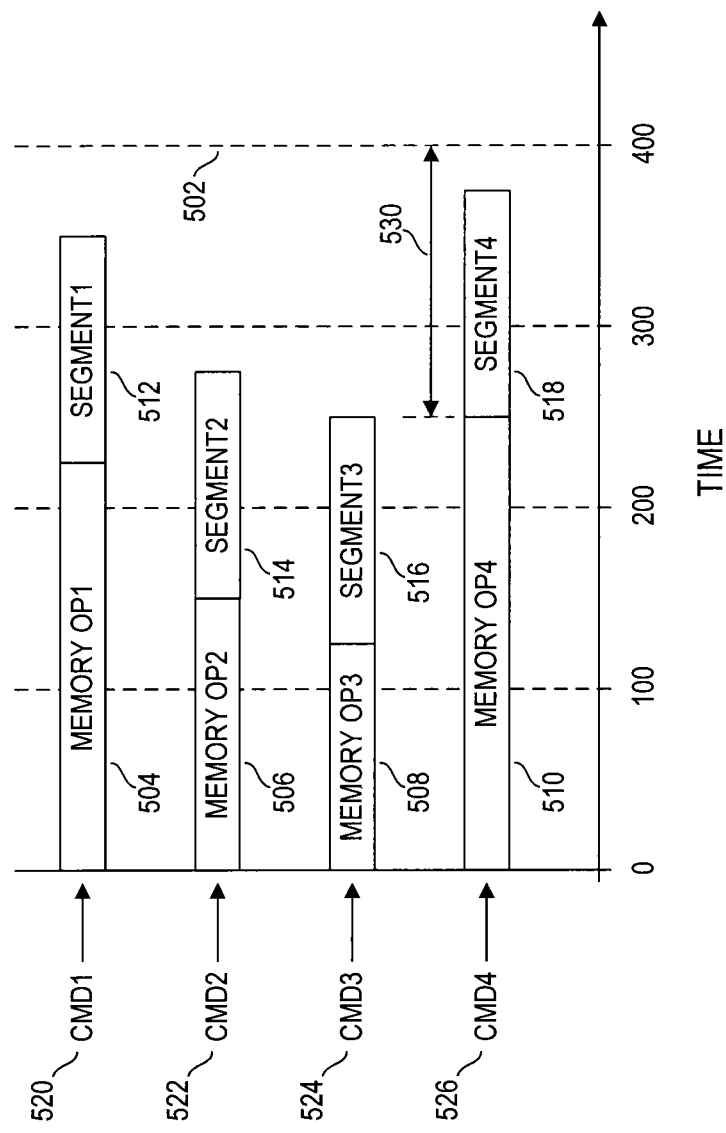
FIG. 5 is a timing diagram of memory operations according to an embodiment of the present disclosure.

FIG. 5 illustrates a timing diagram of a plurality of foreground operations MEMORY OP1-MEMORY OP4 504-510 performed along with a segmented background operation comprising SEGMENT1-SEGMENT4 512-518 according to various embodiments of the present disclosure. Foreground operations 504-510 might comprise the same type of operation or might comprise a combination of different operations. Foreground operations 504-510 might comprise reading, writing and/or erasing operations, for example. One or more of foreground operations 504-510 might comprise operations performed such as part of a reset sequence, such as following the application of power to the memory device, for example. Line 502 is representative of a memory device time frame corresponding to one or more foreground operations. Although one time frame 502 is shown in FIG. 5, different time frames might be associated with different foreground operations according to various embodiments of the present disclosure. For example, a time frame corresponding to an erase operation might be different than a time frame corresponding to read and/or a write operation.

Each foreground operation 504-510 might be initiated in the memory device responsive to a corresponding command CMD1-CMD4 520-526 received from a processor coupled to the memory device, for example. Although the foreground operations 504-510 are shown on the same scale (e.g., time scale), each operation might be performed and the expiration of the corresponding time frame might occur prior to initiating a next operation. For example, a processor might transfer CMD1 520 to the memory device where foreground operation MEMORY OP1 504 is completed and after the expiration of the corresponding time frame 502 the processor transfers CMD2 522 to initiate operation MEMORY OP2 506, for example. Thus, the processor sends a next command following (e.g., subsequent to) the expiration of the time frame 502 corresponding to a previously transferred command. The time scale shown in FIG. 5 is intended to be illustrative and not limiting.

According to one or more embodiments, MEMORY OP1-MEMORY OP4 504-510 might be representative of four erase operations performed in a memory device. A processor coupled to the memory device might transfer a first erase command CMD1 520 to the memory device to perform a first erase operation MEMORY OP1 504. Upon expiration of the time frame 502 corresponding to the first erase operation 504, the processor might transfer a second erase command CMD2 522 to the memory device to perform a second erase operation 506, and so on. Various embodiments take advantage of the time between completing a foreground operation and the expiration of the corresponding time frame 502, such as indicated by the arrow 530, for example. One or more operation segments might be performed within these remaining timing margins 530 and thus facilitate mitigating timing requirement violations in the memory device.

By way of example, it might be desirable to perform a wear-leveling operation in addition to performing erase operations in a memory device. As discussed above with respect to FIG. 2, performing an erase operation along with a complete wear-leveling operation will violate an erase timing requirement of the memory device. Various embodiments facilitate segmenting a background operation, such as a wear-leveling operation as discussed above with respect to FIG. 3, to avoid violating one or more timing requirements of the memory device. One or more of these segments of the segmented wear-leveling operation might be performed in the timing margin between completing each erase operation and the expiration of the corresponding time frame for each erase operation. Thus, the performance of the segmented wear-leveling operation might be "hidden" from the processor as these segments are performed in the timing margins between the completion of a foreground operation, such as an erase operation, and the expiration of the respective time frame of the foreground operation.

Determining the length of SEGMENT1-SEGMENT4 512-518 comprising the wear-leveling operation might be made such as discussed above with respect to FIGS. 3 and 4. For example, a worst case duration to complete an erase operation might be determined. The segment length of SEGMENT1-SEGMENT4 512-518 is assigned responsive to the determined segment margin, such as segment margin 412 discussed above and shown in FIG. 4.

Referring again to FIG. 5, a processor might transfer a command CMD1 520 to a memory device configured to facilitate segmenting one or more operations according to various embodiments of the present disclosure. The transferred command CMD1 520 might comprise a read command to be performed in the memory device. The memory device might perform the read operation (e.g., MEMORY OP1 504) in response to the received command. Control circuitry in the memory device might be configured to perform SEGMENT1 512 subsequent to completion of the read operation MEMORY OP1 504. As the length of SEGMENT1 512 has been assigned to be less than a determined worst case duration of a read operation, SEGMENT1 512 can be performed prior to the expiration of the time frame 502. At some time after the expiration of the time frame 502 associated with MEMORY OP1 504, the processor might transfer CMD2 522 to the memory device to perform a write operation MEMORY OP2 506 in the memory device. Following completion of the write operation MEMORY OP2 506, control circuitry in the memory device facilitates performing the next segment SEGMENT2 514 comprising the segmented wear-leveling operation.

Performance of SEGMENT3 516 and SEGMENT4 518 is facilitated responsive to the processor transferring CMD3 524 and CMD4 526 to initiate MEMORY OP3 508 and MEMORY OP4 510, respectively. CMD3 524 and CMD4 526 might comprise a combination of read, write and/or erase commands, for example. Thus, the segmented wear-leveling operation according to one or more embodiments has been completed by performing segments SEGMENT1-SEGMENT4 512-518 within the timing margin between the completion of each operation MEMORY OP1-MEMORY OP4 504-510 and the expiration of their respective time frames 502. Thus, background operations which might violate one or more timing requirements of the memory device if completely performed in response to completing a foreground operation might be segmented and performed in order to facilitate a reduction in violating one or more timing requirements of the memory device.

As discussed above, different segment margins might be determined corresponding to different operations according to various embodiments of the present disclosure. A segment margin corresponding to a read operation might be different than a segment margin corresponding to a write and/or an erase segment margin, for example. Thus, one or more operations might be divided into segments wherein each segment has a length which is less than or equal to a particular determined segment margin. One or more segments of an operation might be performed during a first time frame so as not to violate a particular timing requirement. During another time frame (e.g., subsequent to the first time frame) one or more remaining segments of the particular operation might be performed. This may be repeated until each segment of the segmented operation has been performed. This facilitates performing one or more segments of a segmented background operation in response to completing a foreground operation and within a corresponding time frame assigned to perform the foreground operation so as to mitigate the occurrence of timing requirement violations in the memory device. Thus, according to one or more embodiments, one or more segments might be performed in the time remaining from when the foreground operation is complete to when the time frame assigned to perform the foreground operation has elapsed. It should be noted that various embodiments are not limited to segmenting wear-leveling operations. Other operations, such as foreground and/or background operations, might be segmented. Various embodiments are not limited to performing one or more segments comprising a segmented operation following only an erase operation.

Various embodiments according to the present disclosure provide state trackers (e.g., non-volatile state trackers) to facilitate maintaining a state of each segment of the plurality of segments of each segmented operation. As illustrated by an example, a memory device might experience an event which can interrupt the performance of one or more segments comprising a segmented operation according to various embodiments of the present disclosure. A reset of the memory device might occur such as part of a system reset or power cycle event occurring in the memory device, for example. A wear-leveling operation might be corrupted during one of these events such as a system reset, for example. Without the non-volatile state trackers the states of the performance of the plurality of segments, such as which segments might have been initiated, partially performed or completed, might be lost in the event of interrupting the operation of the memory device, for example.

Figure 6:
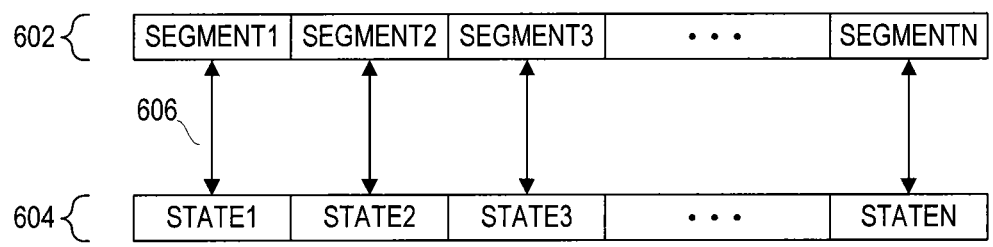
FIG. 6 illustrates a block diagram of a state tracker according to an embodiment of the present disclosure.

FIG. 6 illustrates a graphical representation of a segmented operation (e.g., multiple segment operation) 602 and a corresponding non-volatile state tracker 604 according to an embodiment of the present disclosure. The state tracker 604 is arranged to store a plurality of states STATE1-STATEN, where each state (e.g., state value) corresponds 606 to a particular segment of the corresponding multiple segment (e.g., multi-segment) operation 602. The state tracker 604 comprising the state values might be stored in a location of memory of the memory device, such as in a non-volatile memory location, for example. Each state, such as STATE1-STATEN of the state tracker 604, might comprise a single bit (e.g., milestone bit) corresponding to a segment of the corresponding multi-segment operation 602. A particular bit value might be associated with a particular state of the corresponding operation segment. For example, a bit value of '0' might be indicative of an operation segment that has not yet been completed, whereas a bit value of '1' might be indicative of an operation segment which has been completed, or vice versa, for example. According to one or more embodiments, each state of the state tracker 604 might comprise a plurality of bits indicative of one or more states of the corresponding operation segment. For example, a state value might comprise a value corresponding to a 'segment uninitiated state,' a 'segment initiated state' or a 'segment completed state' according to various embodiments of the present disclosure. The non-volatile nature of the memory location storing the state tracker facilitates retaining each state value of the state tracker even if power should be removed from the memory device, for example.

A memory device according to one or more embodiments might comprise an address remapping unit which facilitates logical to physical address translation, sometimes referred to as logical to physical address mapping, in the memory device. A one to one mapped device might be considered to comprise one physical sector of memory to correspond to one logical sector of memory, for example. To prevent corruption of the one or more state trackers stored in the memory device, one or more logical addresses (e.g., range of logical addresses) corresponding to one or more physical addresses storing the state trackers might be blocked from access except by the memory device control circuitry configured to manage each state tracker. Thus, one or more embodiments facilitate managing access, such as allowing or blocking access, to one or more logical addresses mapped to physical addresses configured to store one or more state trackers corresponding to one or more multi-segment operations. For example, control circuitry of the memory device might have access to physical addresses in memory storing state trackers but a processor coupled to the memory device might not be allowed access.

Figure 7:
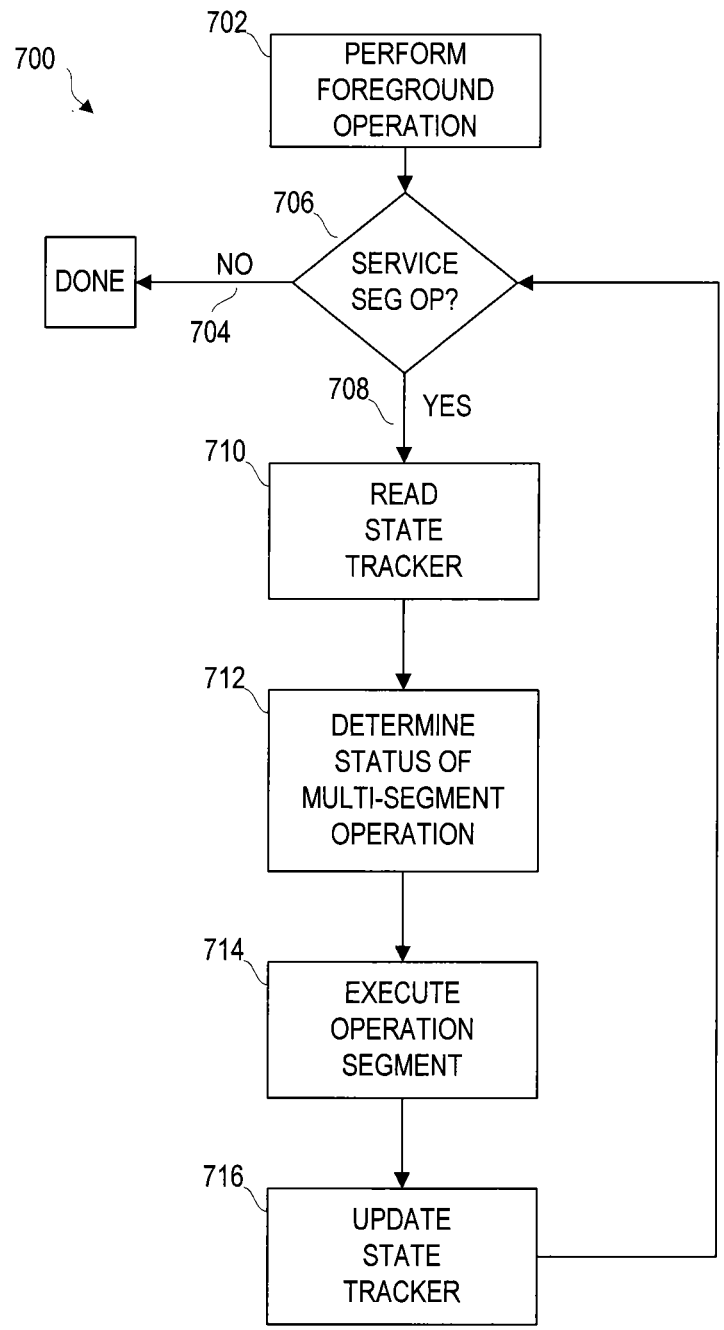
FIG. 7 is a flowchart illustrating a method of performing a segmented operation according to an embodiment of the present disclosure.

FIG. 7 illustrates a flowchart 700 of performing at least a portion of a multiple segment operation and updating a corresponding state tracker (e.g., non-volatile state tracker) according to various embodiments of the present disclosure. Control circuitry of the memory device might make a determination 706 whether to service the multiple segment operation following another operation 702, such as a foreground operation, within a time frame corresponding to (e.g., assigned to perform) the foreground operation. A foreground operation might be performed 702, such as a foreground operation 504-510 performed as discussed above with respect to FIG. 5, for example.

The determination 706 by the control circuitry of the memory device to service the multiple segment operation might be made responsive to various events. A determination might be made responsive to a reset of the memory device, such as following a power cycle of the memory device. A determination 706 might be made responsive to a received command, such as from a processor, to perform a particular foreground operation 702 in the memory device. For example, a processor might transfer a command to the memory device to perform a foreground operation 702 (e.g., erase operation) in the memory device. The control circuitry might make a determination 706 if a segment length of one or more segmented background operation segments is less than or equal to a segment margin, such as discussed above with respect to FIG. 4, corresponding to the erase operation to be performed. If it is determined that sufficient margin exists to perform both the erase operation and at least one operation segment within the time frame for the erase operation, the control circuitry might make a determination to perform 708 at least one operation segment along with the erase operation. If it is determined that there is insufficient margin (e.g., insufficient time between an end of performing the foreground erase operation and the end of the time frame assigned to perform the erase operation) to perform a particular operation segment, then the control circuitry might make a determination to inhibit performing 704 a segment of one or more multiple segment operations within the time frame for the erase operation. Upon receipt of another command from the processor to perform a foreground operation 702 in the memory device, the control circuitry might repeat the determination 706 whether to perform an operation segment 708 or not to perform an operation segment 704 along with the next foreground operation to be performed.

Upon determination to service a multiple segment operation and perform an operation segment 708, the control circuitry reads 710 one or more states of the state tracker corresponding to segments of the multiple segment operation to be serviced. The states of the state tracker 604 indicate the status of each segment the multiple segment operation to be service. For example, one or more status bits of the states comprising the corresponding state tracker, such as 604 shown in FIG. 6, are read to determine the status of the state tracker. A particular segment of the multiple segment operation might be performed 714 responsive to the determination of the status of the multiple segment operation 712. The state tracker is updated 716 responsive to performing a segment 714 of the multiple segment operation. The state tracker might be updated 716 by performing a write operation in the memory location storing the state tracker according to one or more embodiments of the present disclosure. The method illustrated by FIG. 7 (e.g., 702-716) might be repeated until a particular multiple segment background operation has been completed. For example, a particular block of memory of a memory array of a memory device might be identified for wear-leveling. According to various embodiments, segments comprising a multiple segmented wear-leveling operation might be performed as discussed with respect to FIG. 7 until the complete wear-leveling operation has been performed on the entire identified block of memory. This is in contrast to what is sometimes referred to as a suspend operation in a memory device. A suspend operation merely pauses an operation, such as in response to an interrupt occurring in the memory device, which might be resumed at a later time. Should an event such as a reset occur in the memory device, evidence of the suspended operation would be lost.

According to various embodiments, a portion of the method illustrated by FIG. 7 (e.g., 706-716) might be repeated a number of iterations responsive to how many segments might be performed within a segment margin corresponding to the performed foreground operation 702. For example, the control circuitry might determine that sufficient margin exists between an end of the foreground operation 702 and an end of the time frame assigned to perform the foreground operation so as to perform a plurality of segments within the same segment margin. According to one or more embodiments, a timer circuit of a memory device might facilitate determining the segment margin (e.g., remaining time between an end of the foreground operation and the end of the time frame assigned to perform the foreground operation) to determine if one or more segments might be performed subsequent to completing the foreground operation and prior to or concurrent with the end of the time frame assigned to perform the foreground operation, for example.

Figure 8:
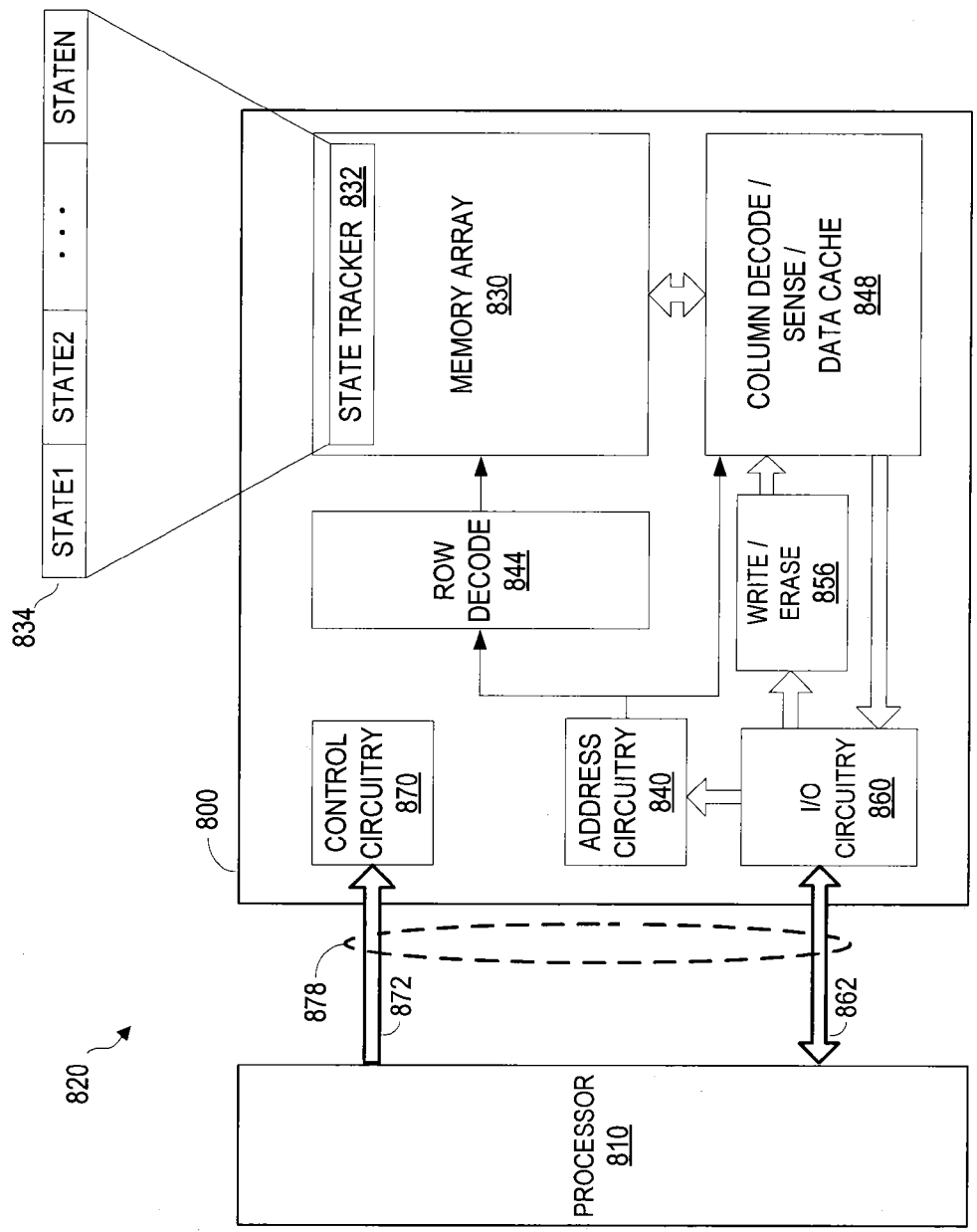
FIG. 8 illustrates a functional block diagram of a memory device coupled to a memory access device as part of an electronic system according to an embodiment of the present disclosure.

FIG. 8 is a functional block diagram of an electronic system having at least one apparatus, such as a memory device 800, according to one or more embodiments of the present disclosure. As used herein, an 'apparatus' can refer to, but is not limited to, an array, circuitry, a device or devices, a semiconductor die or dies, a module or modules and/or a system or systems, for example. The memory device 800 illustrated in FIG. 8 is coupled to a memory access device, such as a processor 810. The processor 810 may be a microprocessor or some other type of control circuitry. The memory device 800 and the processor 810 form part of an electronic system 820. The memory device 800 has been simplified to focus on features of the memory device that are helpful in understanding various embodiments of the present disclosure.

The memory device 800 includes one or more memory arrays 830 that might be logically arranged in rows and columns. The one or more memory arrays 830 might comprise 2D and/or 3D memory arrays. The memory array 830 might include multiple banks and blocks of memory cells residing on a single or multiple die as part of the memory device 800. Memory array 830 might comprise SLC and/or MLC memory. The memory array 830 might also be adaptable to store varying densities (e.g., MLC (four-level) and MLC (eight-level)) of data in each memory cell, for example.

Memory array 830 might comprise memory such as flash memory and/or PCM memory. Memory array 830 might comprise other types of memory such as a dynamic random access memory (DRAM), a synchronous dynamic random access memory (SDRAM), resistive random access memory (RRAM), a double data rate memory (DDR) and/or low power double data rate memory (LPDDR), for example. Memory device 800 might comprise more than one type of memory, such as a combination of volatile and non-volatile memory, for example.

A state tracker 832 corresponding to a multiple segment operation according to one or more embodiments might be stored in a non-volatile location in the memory array 830. The state tracker 832 might comprise a number of locations 834 to store states STATE1-STATEN where each state corresponds to a particular segment of a multiple segment operation, such as described above with respect to FIG. 6, for example. To reduce the risk of corrupting the state values of the state tracker 832, one or more logical addresses corresponding to the state tracker location might be blocked from access other than by control circuitry 870 of the memory device 800 according to various embodiments of the present disclosure.

The memory device 800 reads data in the memory array 830 by sensing voltage or current changes in the memory array columns using sense devices, such as sense/data cache circuitry 848. The sense/data cache circuitry 848, in at least one embodiment, is coupled to read and latch a row of data from the memory array 830. The sense/data cache circuitry 848 might comprise driver circuitry to bias bit lines to various potentials, for example. Input and output (I/O) buffer circuitry 860 is included for bi-directional communication over a communications channel (e.g., I/O bus) 862 with the processor 810. Address and/or data signals might be transferred over the I/O bus between the memory device 800 and the processor 810. An address buffer circuit 840 is provided to latch address signals provided from the I/O circuitry 860. Address signals are received and decoded by a row decoder 844 and a column decoder 848 to access the memory array 830. Row decoder 844 might comprise driver circuitry configured to bias word lines of the memory array 830. Write/erase circuitry 856 is provided to write data to and/or erase data from the memory array 830.

Control circuitry 870 is configured, at least in part, to facilitate implementing various embodiments of the present disclosure. For example, control circuitry 870 might be configured to facilitate performing the method illustrated by FIG. 7 and might comprise one or more timer circuits as discussed above with respect to FIG. 7. Control circuitry 870 might further be configured to manage access to physical addresses in the memory array, such as by blocking one or more logical addresses and to maintain a logical to physical address translation data structure, for example. Control circuitry 870 might comprise one or more timer circuits as discussed above with respect to FIG. 7.

Control circuitry 870 might be coupled (not shown in FIG. 8) to one or more of the elements of the memory device 800. For example, the control circuitry might be coupled to the row decoder 844 and configured to cause the row decoder driver circuitry to bias particular word lines of the memory array 830. Control circuitry 870 might be coupled (not shown in FIG. 8) to and configured to cause the sense/data cache circuitry 848 to bias particular bit lines of the array 830. Control circuitry 870 might further comprise one or more register circuits. In one or more embodiments, control circuitry 870 and/or firmware or other circuitry can individually, in combination, or in combination with other elements, form an internal controller. As used herein, however, a controller need not necessarily include any or all of such components. In some embodiments, a controller can comprise an internal controller (e.g., located on the same die as the memory array) and/or an external controller. In at least one embodiment, the control circuitry 870 may utilize a state machine.

Control signals and commands can be sent (e.g., transferred) by the processor 810 to the memory device 800 over a command bus 872. The command bus 872 may be a discrete signal line or may be comprised of multiple signal lines, for example. The commands sent over the command signal lines 872 are used to control the operations on the memory array 830, including performing data read, data write (e.g., program), and erase operations. The command bus 872 and I/O bus 862 may be combined or may be combined in part to form a number of standard interfaces (e.g., communications interfaces) 878. For example, the interface 878 between the memory device 800 and the processor 810 might be a Universal Serial Bus (USB) interface. The interface 878 might also be a standard interface used with many hard disk drives (e.g., SATA, PATA) as are known to those skilled in the art.

The electronic system illustrated in FIG. 8 has been simplified to facilitate a basic understanding of the features of the memory and is for purposes of illustration only. A more detailed understanding of internal circuitry and functions of non-volatile memories are known to those skilled in the art.

CONCLUSION

Multiple segment operations and non-volatile state trackers in memory devices have been described. In particular, methods of operating memory devices by segmenting operations and providing non-volatile state trackers corresponding to segmented operations have been discussed. Memory device operations might be managed by segmenting operations and performing such segmented operations along with other operations within the memory device to avoid violating specific timing requirements of the memory devices.

Although specific embodiments have been illustrated and described herein, it will be appreciated by those of ordinary skill in the art that any arrangement, which is calculated to achieve the same purpose, may be substituted for the specific embodiments shown. Many adaptations of the disclosure will be apparent to those of ordinary skill in the art. Accordingly, this application is intended to cover any adaptations or variations of the disclosure.

What is claimed is:

1. A method of operating a memory device, the method comprising:
    performing a first memory operation within a first time frame associated with the first memory operation;
    if a length of time to perform a first portion of a second memory operation is deemed to be less than or equal to a length of time between completion of the first memory operation and expiration of the first time frame, performing the first portion of the second memory operation subsequent to completing the first memory device operation and within the first time frame;
    updating a status corresponding to the second memory operation responsive to performing the first portion of the second memory operation;
    performing a third memory operation within a second time frame associated with the third memory operation and subsequent to the first time frame; and
    if a length of time to perform a second portion of the second memory operation is deemed to be less than or equal to a length of time between completion of the third memory operation and expiration of the second time frame, performing the second portion of the second memory operation subsequent to completing the third memory device operation and within the second time frame.

2. The method of claim 1, wherein the second memory operation comprises a multiple segment memory operation and where the first portion and the second portion each comprise a respective first segment and second segment of the second memory operation.

3. The method of claim 1, wherein updating the status responsive to performing the first portion further comprises updating a first portion of the status where the first portion of the status corresponds to a state of the first portion of the second memory operation.

4. The method of claim 3, wherein the state of the first portion comprises a state value corresponding to one of an uninitiated state, initiated state or a completed state.

5. The method of claim 3, further comprising updating the status corresponding to the second memory operation responsive to performing the second portion of the second memory operation.

6. The method of claim 5, wherein updating the status responsive to performing the second portion further comprises updating a second portion of the status where the second portion of the status corresponds to a state of the second portion of the second memory operation.

7. The method of claim 6, wherein updating the first status and the second status further comprises updating the first status and the second status by storing the first status and the second status in a non-volatile state tracker stored in a memory array of the memory device.

8. The method of claim 1, wherein the first operation is performed responsive to a first command received from a memory access device coupled to the memory device.

9. The method of claim 8, wherein the first command comprises one of a read command, a write command or an erase command.

10. The method of claim 8, wherein the third operation is performed responsive to a second command received from the memory access device coupled to the memory device.

11. A method of operating a memory device, the method comprising:
    performing a first memory operation within a first time frame associated with the first memory operation;
    if a length of time to perform a first segment of a plurality of segments of a second memory operation is deemed to be less than or equal to a length of time between completion of the first memory operation and expiration of the first time frame, performing the first segment of the plurality of segments of the second memory operation where the first segment is performed subsequent to completing the first memory operation and within the first time frame;
updating a non-volatile memory location of the memory device configured to store a status corresponding to the first segment of the second memory operation responsive to performing the first segment of the second memory operation;
performing a third memory operation within a second time frame associated with the third memory operation; and
if a length of time to perform a second segment of the plurality of segments of the second memory operation is deemed to be less than or equal to a length of time between completion of the third memory operation and expiration of the second time frame, performing the second segment of the plurality of segments of the second memory operation subsequent to completing the third memory device operation and within the second time frame;
wherein the second time frame occurs subsequent to the first time frame.

12. The method of claim 11, wherein the first and the third memory operations comprise foreground memory operations, and where the second memory operation comprises a background memory operation.

13. The method of claim 11, wherein performing the first memory operation within the first time frame further comprises performing the first memory operation where the first memory operation is initiated concurrently with a beginning of the first time frame, and where performing the third memory operation within the second time frame further comprises performing the third memory operation where the third memory operation is initiated concurrently with a beginning of the second time frame.

14. A method of operating a memory device, the method comprising:
dividing a first memory operation into a plurality of segments, wherein each segment of the plurality of segments of the first memory operation has a respective segment length;
performing a second memory operation within a first time frame associated with the second memory operation;
performing a particular segment of the first memory operation in response to completing the second memory operation and within the first time frame if the respective segment length of the particular segment of the first memory operation is deemed to be less than or equal to a time between completion of the second memory operation and expiration of the first time frame;
updating a status corresponding to the particular segment of the first memory operation responsive to performing the particular segment;
performing a third memory operation within a second time frame associated with the third memory operation where the second time frame occurs subsequent to the first time frame; and
performing a different segment of the first memory operation in response to completing the third memory operation and within the second time frame if the respective segment length of the different segment of the first memory operation is deemed to be less than or equal to a time between completion of the third memory operation and expiration of the second time frame.

15. The method of claim 14, further comprising updating a status corresponding to the different segment of the first memory operation responsive to performing the different segment.

16. The method of claim 14, further comprising determining the respective segment length corresponding to each segment of the plurality of segments.

17. The method of claim 16, wherein each segment length of the plurality of segments is the same segment length.

18. The method claim 16, wherein one or more segment lengths of the plurality of segments are different than one or more other segment lengths of the plurality of segments.

19. The method of claim 16, wherein a determined segment length of a segment comprises a determined length of time to perform the corresponding segment.

20. The method of claim 14, further comprising maintaining a plurality of state trackers each state tracker corresponding to a respective one segment of the plurality of segments.

21. The method of claim 20, further comprising reading a state tracker corresponding to the particular segment prior to performing the particular segment to determine a state of the particular segment.

22. A method of performing a multiple segment operation in a memory device, the method comprising:
dividing a first memory operation into a multiple segment memory operation;
determining a segment length for each segment of the multiple segment memory operation, where a segment length comprises an amount of time to perform a corresponding segment of the multiple segment memory operation;
determining a length of time to perform a second memory operation and determining a length of time to perform a third memory operation;
determining a first segment margin, where the first segment margin comprises a time between an end of the length of time to perform the second memory operation and an end of a first time frame;
determining a second segment margin, where the second segment margin comprises a time between an end of the length of time to perform the third memory operation and an end of a second time frame;
determining if a segment length of a first segment is less than or equal to the first segment margin;
performing the second memory operation during the first time frame and subsequently performing the first segment within the first time frame when the segment length of the first segment is less than or equal to the first segment margin.
determining if a segment length of a second segment is less than or equal to the second segment margin; and
performing the third memory operation during the second time frame and subsequently performing the second segment within the second time frame when the segment length of the second segment is less than or equal to the second segment margin;
wherein the second time frame occurs subsequent to the first time frame.

23. An apparatus, comprising:
a non-volatile memory array; and
a controller, wherein the controller is configured to:
perform a first memory operation within a first time frame associated with the first memory operation and, when a length of time to perform a first segment of a second memory operation is deemed to be less than or equal to a length of time between completion of the first memory operation and expiration of the first time frame, perform the first segment of the second memory operation subsequent to a completion of the first memory operation and within the first time frame;

update a status stored in the non-volatile memory array and corresponding to the second memory operation, where the status is updated responsive to the performance of the first segment of the second memory operation;

perform a third memory operation within a second time frame associated with the third memory operation and, when a length of time to perform a second segment of the second memory operation is deemed to be less than or equal to a length of time between completion of the third memory operation and expiration of the second time frame, perform the second segment of the second memory operation subsequent to a completion of the third memory operation and within the second time frame;

wherein the first memory operation and the first segment of the second memory operation are completed within the first time frame;

wherein the third memory operation and the second segment of the second memory operation are completed within the second time frame; and wherein the second time frame occurs subsequent to the first time frame.

24. The apparatus of claim 23, wherein the controller is further configured to perform the first memory operation responsive to a first command generated by a memory access device coupled to the apparatus, and to perform the third memory operation responsive to a second command generated by the memory access device.

25. The apparatus of claim 24, wherein the first command comprises one of a read, write or erase command, and where the second command comprises one of a read, write or erase command.

26. The apparatus of claim 23, wherein the non-volatile memory array comprises one of an array of flash memory cells or an array of phase change (PCM) memory cells.

27. The apparatus of claim 23, wherein the controller is further configured to update the status stored in the non-volatile memory array responsive to the performance of the second segment of the second memory operation.

28. The apparatus of claim 23, wherein the controller is further configured to maintain a logical to physical address translation data structure.

29. The apparatus of claim 28, wherein the controller is further configured to block access to one or more physical addresses from the logical to physical address translation data structure when the one or more physical addresses store the status corresponding to the second memory operation.

30. The apparatus of claim 23, wherein the status is stored in a non-volatile state tracker stored in the non-volatile memory array.

* * * * *